United States Patent
Lin et al.

(10) Patent No.: US 7,505,517 B2
(45) Date of Patent: *Mar. 17, 2009

(54) GENERATING A DUMMY BIDIRECTIONAL PREDICTIVE FIELD PICTURE

(75) Inventors: Shu Lin, Indianapolis, IN (US); Donald Henry Willis, Indianapolis, IN (US)

(73) Assignee: Thomsong Licensing, Boulogne, Billancourt (FR)

( * ) Notice: Subject to any disclaimer, the term of this patent is extended or adjusted under 35 U.S.C. 154(b) by 870 days.

This patent is subject to a terminal disclaimer.

(21) Appl. No.: 10/493,281

(22) PCT Filed: Oct. 22, 2002

(86) PCT No.: PCT/US02/33993

§ 371 (c)(1),
(2), (4) Date: Apr. 22, 2004

(87) PCT Pub. No.: WO03/036809

PCT Pub. Date: May 1, 2003

(65) Prior Publication Data

US 2004/0196908 A1   Oct. 7, 2004

Related U.S. Application Data

(60) Provisional application No. 60/334,914, filed on Oct. 23, 2001.

(51) Int. Cl.
*H04N 7/12* (2006.01)
*H04N 5/91* (2006.01)

(52) U.S. Cl. ............... 375/240.16; 386/68; 375/240.15
(58) Field of Classification Search ........... 375/240.16, 375/240.15, 240.27, 240.29; 348/526; 386/68
See application file for complete search history.

(56) References Cited

U.S. PATENT DOCUMENTS

| | | | |
|---|---|---|---|
| 5,739,862 A | 4/1998 | Cen | 348/402 |
| 5,822,541 A | 10/1998 | Nonomura | 395/200.77 |
| 5,912,709 A | 6/1999 | Takahashi | 348/416 |
| 5,956,088 A | 9/1999 | Shen et al. | 348/385 |
| 5,987,179 A | 11/1999 | Rick et al. | 382/236 |
| 6,118,491 A * | 9/2000 | Wu et al. | 348/526 |
| 7,149,410 B2 * | 12/2006 | Lin et al. | 386/68 |
| 2003/0147467 A1 * | 8/2003 | Lin et al. | 375/240.15 |

* cited by examiner

*Primary Examiner*—Gims S Philippe
(74) *Attorney, Agent, or Firm*—Robert D. Shedd; Robert B. Levy; Jorge Tony Villabon

(57) ABSTRACT

The invention concerns a method and system for generating a dummy bidirectional predictive (dummy B) field picture. The method includes the steps of setting at least a portion of a first indicator of the dummy B field picture to indicate that no encoding of a residual signal will occur and setting at least a portion of a second indicator of the dummy B field picture to indicate that the dummy B field picture will be predicted from at least one field among a first field and a last field of a reference picture to control a vibration artifact. The dummy B field picture can be a forward or a backward predicted field picture, and the at least one field from which the dummy B field picture is predicted can be a first or last field of the reference picture.

30 Claims, 4 Drawing Sheets

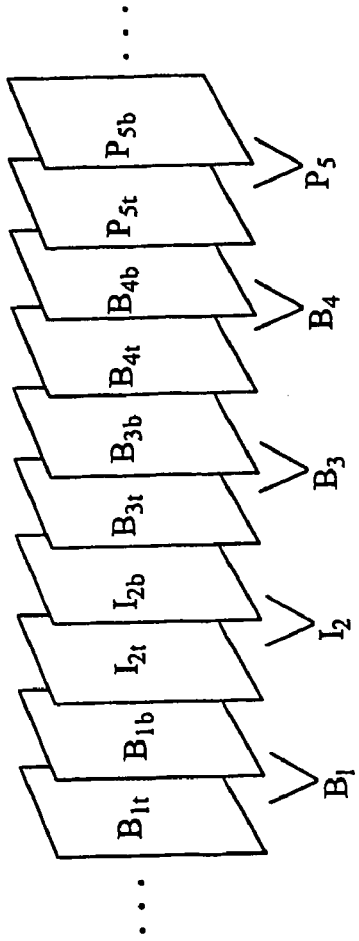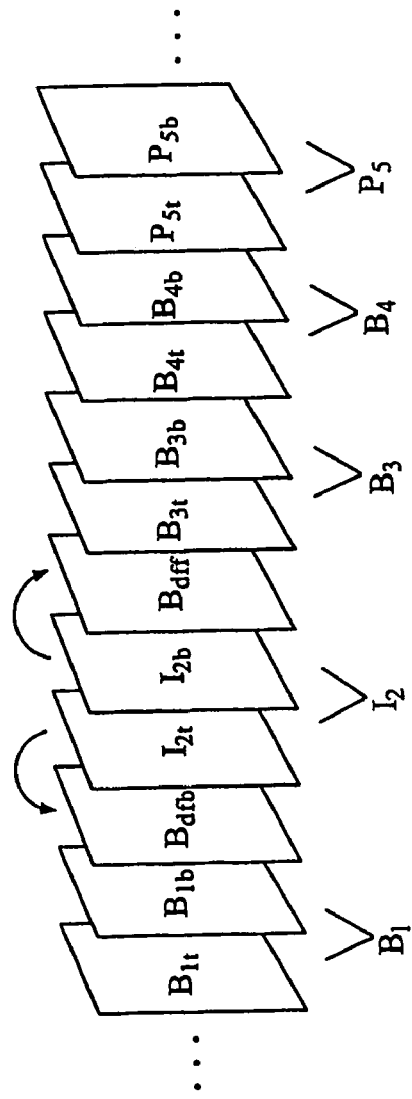
FIG. 4A
FIG. 4B

GENERATING A DUMMY BIDIRECTIONAL PREDICTIVE FIELD PICTURE

This application claims the benefit under 35 U.S.C. § 365 of International Application PCT/US02/33993, filed Oct. 22, 2002, which claims the benefit of U.S. Provisional Application No. 60/334,914, filed Oct. 23, 2001.

BACKGROUND OF THE INVENTION

1. Technical Field

The inventive arrangements relate generally to video systems and more particularly to video systems that record or play back digitally encoded video sequences.

2. Description of Related Art

Digital televisions (DTV) and high-definition televisions (HDTV) are gaining popularity in today's consumer electronics marketplace. Many purchasers of these types of televisions also buy digital video recorders or players, such as digital video disc (DVD) recorders or players, for purposes of viewing previously recorded programs or recording their favorite programs. Notably, the combination of a DTV (or an HDTV) and a digital video recorder or player can be an integral part of a home theater entertainment system.

A digital video recorder or player typically contains a Moving Pictures Expert Group (MPEG) decoder to decode the digitally encoded multimedia data that is stored on the discs that the recorder or player plays. If the digital video recorder or player is connected to a conventional (non-DTV or non-HDTV) television, the digitally encoded signal will be decoded by the digital video recorder or player's MPEG decoder before being displayed on the conventional television. Significantly, however, many DTV's contain their own MPEG decoders. As such, if a digital video recorder or player is connected to a DTV, the video signal read from the disc is remotely decoded by the DTV's decoder. This configuration can be referred to as a remote decoder arrangement.

There is, however, an important disadvantage to decoding digitally encoded signals with a remote DTV decoder. Namely, it is very difficult to perform trick modes in this type of arrangement. A trick mode can be any playback of video in which the playback is not done at normal speed or in a forward direction. Oftentimes, a trick mode involves repeating a number of pictures in a video signal such as during a slow motion or freeze trick mode. As the bandwidth between the digital video recorder or player and the DTV is limited, repeating pictures in the signal being fed to the DTV may cause the signal to exceed the maximum bit rate limit of the transmission channel. The problem is even more acute if the pictures are intra (I) pictures or predictive (P) pictures, as these pictures may be encoded with a relatively large number of bits.

Moreover, even the process of skipping pictures, such as the case during a fast motion trick mode, can cause the average bit rate of a video signal to exceed the bit rate. Specifically, the first pictures in a group of pictures (GOP) to be skipped in a fast motion trick mode are typically the bidirectional predictive (B) pictures. As the B pictures are skipped, the average amount of encoded data for the remaining pictures, or the average number of bits per picture, in the GOP increases. Exceeding the bit rate limit of a transmission channel can lead to buffer overflow and the loss of pictures during the display of the trick mode video signal.

In addition to the bit rate problem, there is another disadvantage to decoding video signals remotely: the repeated display of non-progressive pictures in such an arrangement can cause a vibration effect to appear in the display if the repeated pictures contain a moving object. To explain this drawback, a brief explanation of interlaced scanning is warranted.

Many televisions employ the interlaced scanning technique. Under this format, the video signal is typically divided into a predetermined number of horizontal lines. During each field period, only one-half of these lines are scanned; generally, the odd-numbered lines are scanned during the first field period, and the even-numbered lines are scanned during the next field period. Each sweep is referred to as a field, and when combined, the two fields form a complete picture or frame. For an NTSC system, sixty fields are displayed per second, resulting in a rate of thirty frames per second.

As a moving object moves across the screen in an interlaced scanning television, each field will only display a portion of the moving object. This partial display is because a field only displays every other horizontal line of the overall picture. For example, for a particular field n, only the odd-numbered horizontal lines are scanned, and the portion of the moving object that will be displayed in field n is the portion that is scanned during the odd-numbered horizontal line sweep for field n. The next field, field n+1, is created ⅙₀ of a second later and will display the even-numbered horizontal lines of the picture. Thus, the portion of the moving object that is displayed in field n+1 is the portion that is scanned during the even-numbered horizontal line sweep for field n+1. Although each field is temporally distinct, the human eye perceives the sequential display of the fields as smooth motion due to the speed at which the fields are displayed.

If a viewer activates a trick mode, the trick mode video signal may contain repeated pictures, pictures that were recorded under the interlaced scanning format. For example, if the viewer initiates a freeze trick mode on a particular picture, then that picture can be repeatedly transmitted to and decoded and displayed at the DTV containing the remote decoder. The display of the repeated picture, however, is in accordance with the normal display of a non-progressive picture, i.e, the fields that make up the non-progressive picture are alternately displayed.

As noted earlier, if a moving object appears in the pictures recorded under the interlaced scanning format, each field will display the moving object in one specific position. Thus, as these fields are alternately displayed during the freeze trick mode, the moving object in the display rapidly moves from one position in the display to another and back again; in effect, the moving object appears to vibrate. This vibration is created because the interlaced fields are temporally distinct, and the moving object appears in a different position for each field.

This problem is also present in DTVs that include a deinterlacer. As is known in the art, a deinterlacer can construct complete frames from an interlaced field. Thus, a deinterlacer can construct complete frames out of the fields that comprise the repeated non-progressive frame. Nevertheless, these complete frames constructed from the interlaced fields will also be displayed in an alternate fashion thereby creating the possibility of the vibration artifact. In addition, this vibration effect appears in not only a freeze trick mode but may also be present in any other trick mode in which non-progressive pictures are repeated. Thus, it is desirable to eliminate the bit rate problem and the vibration artifact without increasing system costs or complexity.

SUMMARY OF THE INVENTION

The present invention concerns a method of generating a dummy bidirectional predictive field picture. The method includes the steps of setting at least a portion of a first indicator of the dummy bidirectional predictive field picture to indicate that no encoding of a residual signal will occur and setting at least a portion of a second indicator of the dummy bidirectional predictive field picture to indicate that the dummy bidirectional predictive field picture will be predicted from at least one field among a first field and a last field of a reference picture to control a vibration artifact. The setting the first indicator step can further include setting at least a portion of the first indicator of the dummy bidirectional predictive field picture to indicate that no discrete cosine transform (DCT) encoding of the residual signal will occur.

In addition, the dummy bidirectional predictive field picture can include a plurality of macroblocks and wherein at least a portion of the first indicator is contained within a macroblock header. Each macroblock can contain at least one motion vector having horizontal and vertical motion components, and setting the first indicator step can include the step of setting at least a portion of the first indicator to indicate that the horizontal and vertical motion components will be zero.

In one arrangement, the dummy bidirectional predictive field picture can be a backward predicted field picture, and at least a portion of the first indicator can include a motion_code[0][1][0] flag and a motion_code[0][1][1] flag. The step of setting at least a portion of the first indicator can include setting the motion_code[0][1][0] flag and the motion_code[0][1][1] flag to a value of one. Alternatively, the dummy bidirectional predictive field picture can be a forward predicted field picture, and at least a portion of the first indicator can include a motion_code[0][0][0] flag and a motion_code[0][0][1] flag. The step of setting at least a portion of the macroblock header can include setting the motion_code[0][0][0] flag and the motion_code[0][0][1] flag to a value of one.

In another aspect, the reference picture can be an intra picture or a predictive picture. Also, the reference picture can be a non-progressive picture, a progressive picture or a field picture. In yet another aspect, the dummy bidirectional predictive field picture can be a backward predicted field picture, and the at least one field from which the dummy bidirectional predictive field picture is predicted can be a first field of the reference picture.

The first field can be a top field, and at least a portion of the second indicator can be in a macroblock header in which at least a portion of the second indicator can include a motion_vertical_field_select[0][1] flag. The step of setting at least a portion of the second indicator can include the step of setting the motion_vertical_field_select[0][1] flag to a value of zero. In another arrangement, the first field can be a bottom field, and at least a portion of the second indicator can be in a macroblock header in which at least a portion of the second indicator can include a motion_vertical_field_select[0][1] flag. The step of setting at least a portion of the second indicator can include the step of setting the motion_vertical_field_select[0][1] flag to a value of one.

In yet another arrangement, the dummy bidirectional predictive field picture can be a forward predicted field picture, and the at least one field from which the dummy bidirectional predictive field picture can be predicted is a last field of the reference picture. The last field can be a top field, and at least a portion of the second indicator can be in a macroblock header in which at least a portion of the second indicator can include a motion_vertical_field_select[0][0] flag. The step of setting at least a portion of the second indicator can include the step of setting the motion_vertical_field_select[0][0] flag to a value of zero.

Alternatively, the last field can be a bottom field, and at least a portion of the second indicator can be in a macroblock header in which at least a portion of the second indicator can include a motion_vertical_field_select[0][0] flag. The step of setting at least a portion of the second indicator can include the step of setting the motion_vertical_field_select[0][0] flag to a value of one. The method can also include the step of skipping at least a portion of the macroblocks when the dummy bidirectional predictive field picture and the at least one field of the reference picture have the same parity.

The present invention also concerns a system for generating a dummy bidirectional predictive field picture. The system includes a controller for reading data from a storage medium and a processor. The processor is programmed to set at least a portion of a first indicator of the dummy bidirectional predictive field picture to indicate that no encoding of a residual signal will occur and to set at least a portion of a second indicator of the dummy bidirectional predictive field predictive picture to indicate that the dummy bidirectional predictive field picture will be predicted from at least one field among a first field and a last field of a reference picture to control a vibration artifact. The system also includes suitable software and circuitry to implement the methods as described above.

BRIEF DESCRIPTION OF THE DRAWINGS

FIG. 4A illustrates a portion of a typical group of pictures containing non-progressive pictures.

FIG. 4B demonstrates several ways to predict dummy bidirectional predictive field pictures from a non-progressive reference picture.

DETAILED DESCRIPTION OF THE PREFERRED EMBODIMENTS

Figure 1:
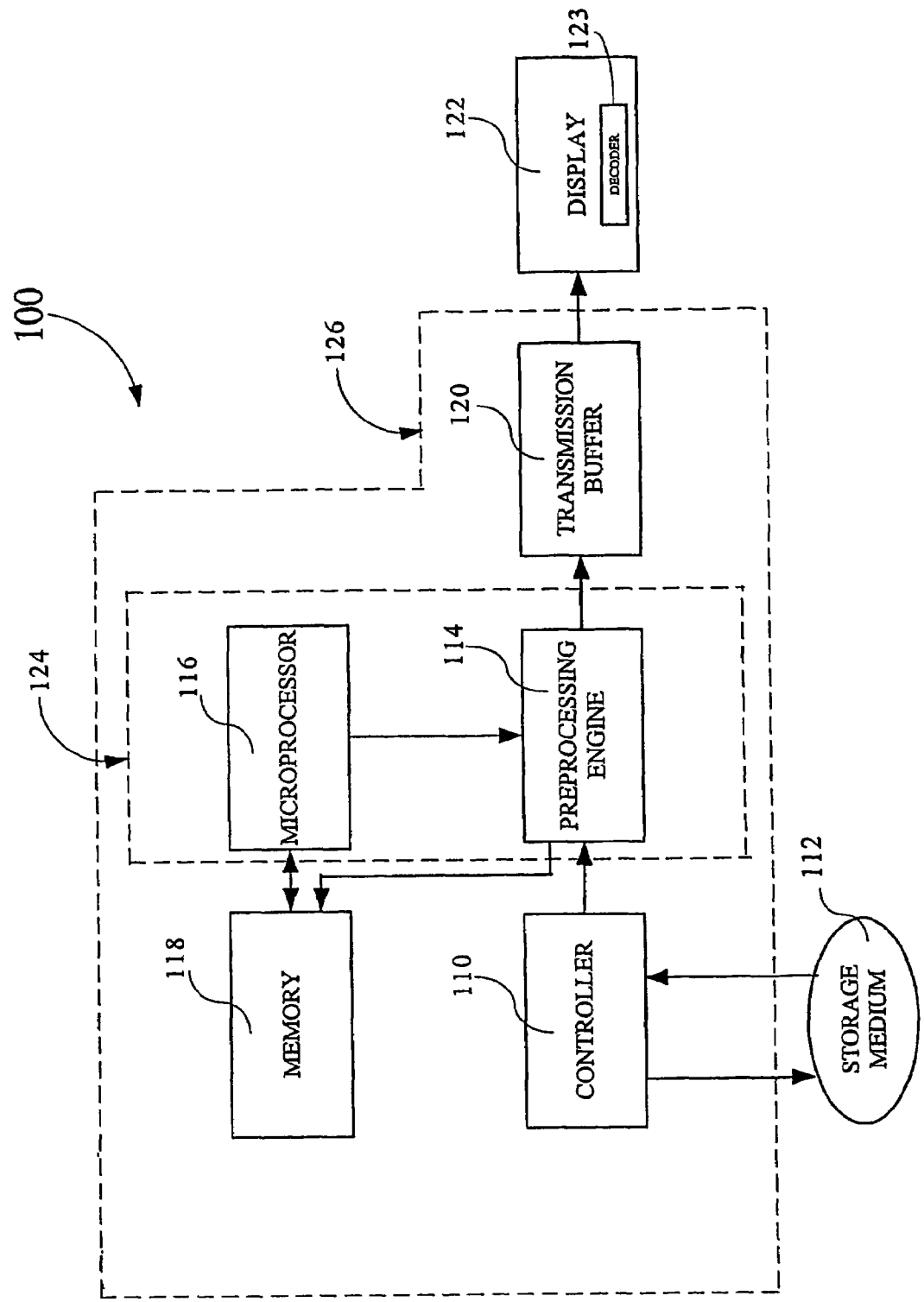
FIG. 1 is a block diagram of a system that can generate a dummy bidirectional predictive picture in accordance with the inventive arrangements herein.

A system 100 for implementing the various advanced operating features in accordance with the inventive arrangements is shown in block diagram form in FIG. 1. The invention, however, is not limited to the particular system illustrated in FIG. 1, as the invention can be practiced with any other system capable of receiving a digitally encoded signal and transferring that signal to a display device. In addition, the system 100 is not limited to reading data from or writing data to any particular type of storage medium, as any storage medium capable of storing digitally encoded data can be used with the system 100.

The system 100 can include a controller 110 for reading data from and writing data to a storage medium 112. The system 100 can also have a preprocessing engine 114, a microprocessor 116, memory 118, a transmission buffer 120 and a display device 122. The preprocessing engine 114 can contain suitable software and circuitry for locating and setting or adjusting one or more particular flags or parameters in the digitally encoded video signal for purposes of generating dummy B field pictures. Control and data interfaces can also be provided for permitting the microprocessor 116 to control the operation of the controller 110 and the preprocessing engine 114. Suitable software or firmware can be provided in memory for the conventional operations performed by the microprocessor 116. Further, program routines can be provided for the microprocessor 116 in accordance with the inventive arrangements.

It should be understood that all or portions of the preprocessing engine 114 and the microprocessor 116 can be a processor 124 within contemplation of the present invention. Further, all or portions of the controller 110, the preprocessing engine 114, the microprocessor 116 and the transmission buffer 120 can be a bitstream source 126 within contemplation of the present invention.

In one arrangement, the display device 122 can contain its own decoder 123 for decoding all or a portion of any video signal read from the storage medium 112 and processed by the bitstream source 126. In this particular arrangement, a decoder (not shown) in the bitstream source 126 typically does not decode the video signal read from the storage medium 112. This particular embodiment can be referred to as a remote decoder arrangement. It should be noted, however, that the invention is not limited to this arrangement, as the invention can be practiced in any other suitable system.

In operation, the controller 110 can read a video signal containing a plurality of pictures from the storage medium 112. These pictures can be non-progressive pictures, progressive pictures or field pictures. In one arrangement, if the microprocessor 116 receives a trick mode command, then the microprocessor 116 can signal the preprocessing engine 114 to generate dummy B field pictures that can be predicted from the pictures in the digitally encoded video signal by locating and setting or adjusting several predetermined flags and parameters of the, for example, MPEG syntax of these field pictures. The dummy B field pictures can then be transferred to the transmission buffer 120 and on to the display device 122. The decoder 123 can decode the dummy B field pictures, and display device 122 can display them.

The above discussion is an example of how the dummy B field pictures can be generated once the microprocessor 116 receives a trick mode command. Such a process is referred to as generating dummy B field pictures "on the fly." Attentively, however, the preprocessing engine 114 and the microprocessor 116 can generate dummy B field pictures prior to the initiation of a trick mode command. As an example, the dummy B field pictures can be generated, and the microprocessor 116 can instruct the preprocessing engine 114 to transfer one or more of the dummy B field pictures to memory 118. At memory 118, the dummy B field pictures can be stored until a trick mode command is received, at which time the microprocessor 116 can insert the dummy B field pictures into the video signal. The overall operation of the invention will be discussed in greater detail below.

Generating a Dummy Bidirectional Predictive Field Picture

Figure 2:
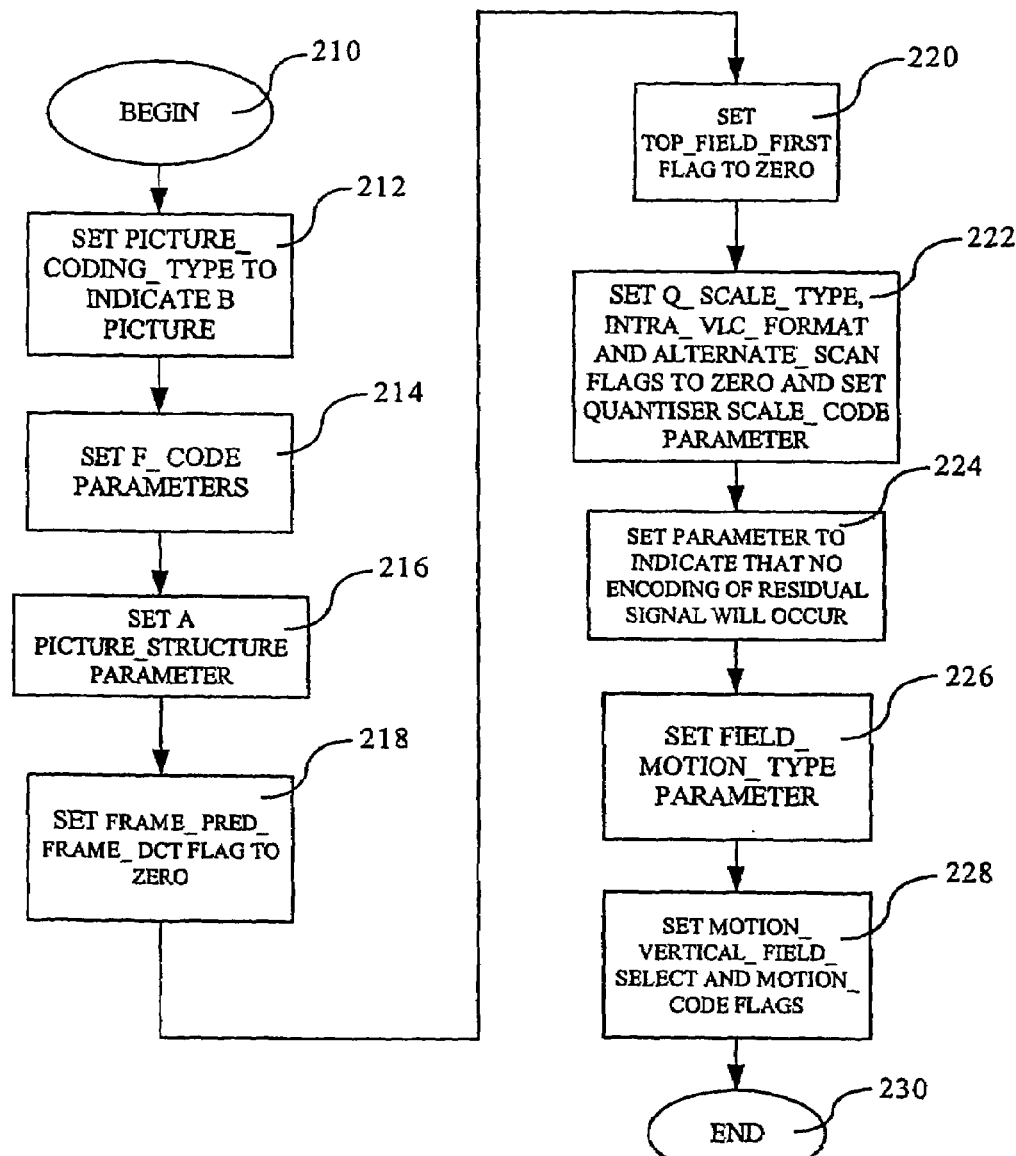
FIG. 2 is a flow chart that illustrates an operation of generating a dummy bidirectional predictive picture in accordance with the inventive arrangements.

Referring to FIG. 2, a method 200 illustrates one way in which a dummy B field picture can be generated. In one embodiment, the invention can be practiced in a remote decoder arrangement. For purposes of the invention, a remote decoder arrangement can be any system in which at least a portion of the pictures in a video signal can be decoded by a decoder that is external to and not under the control of a bitstream source that is providing the pictures to the decoder. As an example, the bitstream source can be an optical storage medium player or recorder that reads multimedia data from an optical storage medium and transfers this data over a transmission channel to a digital television, which contains its own decoder. It is understood, however, that the invention is not limited to this example or even a remote decoder arrangement, as the invention can be practiced in any other suitable system or arrangement.

Figure 3:
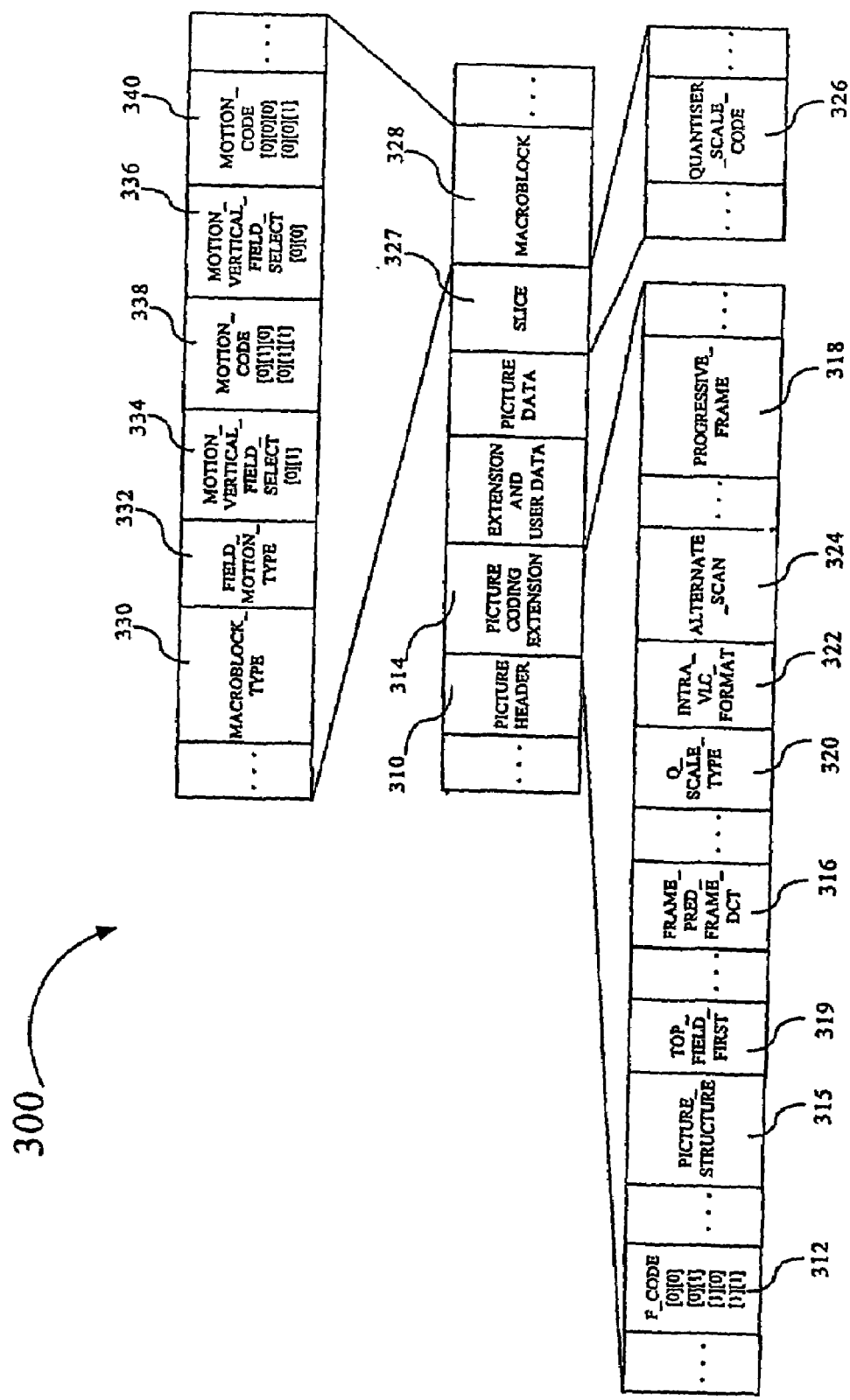
FIG. 3 is an illustration of certain portions of a typical MPEG syntax.

Referring to FIG. 3, a portion of a typical MPEG syntax 300 of a digitally encoded picture is shown. This syntax 300 can represent the syntax of a dummy B field picture in accordance with the inventive arrangements. FIG. 3 will be discussed in conjunction with FIG. 2 for purposes of describing how a dummy B field picture can be generated. It should be noted that only those portions of the syntax 300 that are relevant to the generation of dummy B field pictures from non-progressive frames, in particular, dummy B field pictures that can reduce the vibrating pictures artifact, will be discussed. Those of skill in the art will appreciate, however, that the portions of the syntax 300 that are not discussed here are already known through the use of conventional B field pictures and that the dummy B field pictures can be predicted from progressive pictures and field pictures.

Referring back to FIG. 2, at step 210, the process for generating dummy B field pictures from a non-progressive picture can begin. At step 212, a picture_coding_type parameter (not shown) contained in a picture header 310 of the syntax 300 (see FIG. 3) can be set to indicate that the dummy B field picture will be a B picture. Preferably, the picture_coding_type parameter is a three bit parameter, and the value can be set to "011." At step 214, f-code parameters can be set. In FIG. 3, the f_code parameters 312, typically including four bit parameters f_code[0][0], f_code[0][1], f_code[1][0] and f_code[1][1], are located in a picture coding extension header 314.

The dummy B field picture can be a one-directional prediction picture. A one-directional prediction picture is predicted from merely one picture, whereas a conventional B frame picture is generally predicted from two separate pictures. Typically, a one-directional dummy B field picture can either be a forward predicted dummy B field picture or a backward predicted dummy B field picture. If the dummy B field picture is a forward predicted dummy B field picture, then the dummy B field picture can be predicted from a reference picture that is before (in display order) the dummy B field picture. In contrast, if the dummy B field picture is a backward predicted dummy B field picture, then the dummy B field picture can be predicted from a reference picture that follows (in display order) the dummy B field picture. Because they are predicted merely from one picture, one-directional prediction dummy B field pictures can be suitable for repeating or duplicating pictures.

If the dummy B field picture is a backward predicted field picture, then f_code[0][0] and f_code[0][1] can be set to a value of "1111" to indicate that no forward prediction is to occur. In addition, f_code[1][0] and f_code[1][1] can be set to reflect the motion vector range value for the backward prediction. In contrast, if the dummy B field picture is a forward predicted field picture, then f_code[1][0] and f_code[1][1] can be set to a value "1111" to indicate that no backward prediction will occur, and f_code[0][0] and f_code[0][1] can be set to reflect the motion vector range value for the forward prediction.

Referring back to the method 200, at step 216, a picture_structure parameter (picture_structure 315 in FIG. 3) can be set to a value of either "01" or "10." Setting the picture_structure parameter 315 to a value of "01" can indicate that the dummy B field picture is a top field picture, and setting the parameter 315 to a value of "10" can indicate that the dummy B field picture is a bottom field picture. For purposes of the invention and in accordance with the MPEG syntax, it is irrelevant as to which of these values the picture_structure parameter 315 is set. This principle is applicable if the dummy B field picture is predicted from a field picture of a non-progressive picture. For example, if the dummy B field picture is to be predicted from a top field of a non-progressive picture, the picture_structure parameter 315 can be set to either of the values discussed above, and the dummy B field picture can be a top field picture or a bottom field picture.

Continuing with the method 200, a frame_pred_frame_dct flag (frame_pred_frame_dct flag 316 in FIG. 3) can be set to a value of "0," as shown at step 218. Setting the frame_pred_frame_dct flag 316 to a value of "0" can cause a decoder decoding the dummy B field picture to employ field-based prediction when constructing the dummy B field picture. In addition, a top_field_first flag (top_field_first flag 319 in FIG. 3) can be set to a value of "0" in accordance with the MPEG syntax of a field picture, as shown in step 220.

At step 222 of the method 200, the following flags can be set to a value of "0":Q_scale_type (Q_scale_type flag 320 in FIG. 3), Intra_vlc_format (Intra_vlc_format flag 322 in FIG. 3) and Alternate_scan (Alternate_scan flag 324 in FIG. 3). These flags can be set to a value of "0" because no encoding of the prediction error or residual signal will occur. Also, a Quantiser_scale_code parameter (Quantiser_scale_code parameter 326 in FIG. 3) can be set to a value of "00101" because the residual signal will not be encoded. Referring back to FIG. 3, the Quantiser_scale_code parameter 326 can be located in a slice header 327 (for simplicity, only one slice header 327 is shown in the syntax 300).

As the dummy B field picture can include a plurality of macroblocks, the syntax 300 can include a plurality of macroblock headers 328, where each macroblock header 328 can be associated with a single macroblock (similar to the slice header, only one macroblock header 328 is illustrated in the syntax 300 for purposes of simplifying the drawing). A first indicator can be located within the macroblock header 328. In one arrangement, a portion of the first indicator can be a macroblock_type parameter 330. Referring to FIGS. 2 and 3, at step 224 of method 200, the macroblock_type parameter 330 can be set to indicate that no encoding of a residual signal will occur. As an example, in a conventional B field picture, a discrete cosine transform (DCT) is typically used to encode the residual signal. Thus, in one arrangement, no DCT encoding of the residual signal of each dummy B field picture will occur. It is understood that the invention is not limited in this regard, however, as any other suitable parameter can be set to indicate that no encoding of the residual signal, whether by DCT or any other algorithm, will occur.

In one arrangement, the macroblock_type parameter 330 can be set to a value of "010." This setting can indicate that the following flags (not shown) are to be set to "0": macroblock_quant; macroblock_pattern; macroblock_intra; spatial_temporal_weight_code_flag and permitted_spatial_temporal_weight_classes. In addition, this setting can indicate that a macroblock_motion_backward flag (not shown) can be set to a value of "1," which is used if the dummy B field picture will be backward predicted. In another example, the macroblock_type parameter 330 can be set to a value of "0010." In this example, the settings are the same as discussed above, except that a macrobock_motion_forward flag (not shown) can be set to a value of "1" instead of the macroblock_motion_backward flag.

A field_motion_type parameter (field_motion_type parameter 332 in FIG. 3) can be set, as shown at step 226. This setting can indicate that the prediction type is field-based prediction, the motion_vector_count is "1," the mv_format is field and the dmv is "0." Continuing with the method 200, at step 228, a second indicator such as a motion_vertical_field_select flag can be set.

For example, referring to FIG. 3, a motion_vertical_field_select[0][1] flag 334 or a motion_vertical_field_select[0][0] flag 336 can be set to indicate which field of the reference picture will be used to predict the dummy B field picture. The motion_vertical_field_select[0][1] flag 334 is associated with a backward predicted dummy B field picture, and the motion_vertical_field_select[0][0] flag 336 is associated with a forward predicted dummy B field picture. The second indicator is not limited to these flags, however, as any other suitable flag or parameter can be used to conduct the desired prediction scheme.

As is known in the art, certain macroblocks of digitally encoded pictures may be skipped based on the parity of a field of a reference picture and a field (of a non-progressive frame picture) or field picture that is predicted from the reference picture field. As an example, if a video signal containing non-progressive pictures is being played back, each reference picture and non-reference picture can have a top field and a bottom field. More specifically, if the bottom field of the non-reference picture is predicted from a field of the reference picture having the same parity—in this case, the field of the reference picture can be a bottom field—then a large number of the macroblocks that make up the bottom field of the non-reference picture can be skipped.

In fact, all the macroblocks that make up a slice except for the first and last macroblocks can be skipped if the relevant fields have the same parity. The net effect is that the non-reference picture will contain much less encoded information than that typically required to encode such a picture. This process also applies to field pictures. Those of skill in the art will appreciate that the macroblock_escape and macroblock_address_increment parameters in the MPEG syntax (not shown here) can be manipulated to perform this process.

The above discussion concerning the skipping of macroblocks also applies to the invention. That is, if a generated dummy B field picture is predicted from a reference picture in which the parity of the dummy B field picture matches that of the field of the reference picture, one or more of the macroblocks that comprise the dummy B field picture can be skipped. The same holds true if the dummy B field picture is predicted from a reference field picture having the same parity. Skipping macroblocks of a dummy B field picture can produce a dummy B field picture containing very little encoded information, which can help reduce an elevated bit rate of a video signal into which these pictures are inserted.

The dummy B field picture can be predicted from any suitable reference picture. A reference picture can be, for example, a progressive picture, a non-progressive picture or even a field picture. Moreover, a reference picture can be, for example, an intra picture or a predictive picture. If the reference picture is a non-progressive picture, the reference picture can include at least a first field and a last field. A first field can be a field of a reference picture that is to be displayed before any other field that makes up the reference picture. Conversely, a last field can be a field of a reference picture that is to be displayed last among the fields that comprise the reference picture.

In many cases, the reference picture can include a top field and a bottom field, and the first field can be a top field, and the last field can be a bottom field. An example of this arrangement is illustrated in FIG. 4A, which shows a portion of a group of pictures 400 in display order. The picture I$_2$ can be a reference picture from which dummy B field pictures can be predicted (any other suitable reference picture in the GOP 400 can be used as well). Picture $I_2$ can include a top field, $I_{2t}$, and a bottom field, $I_{2b}$, where the letter "t" identifies a field as a top field and the letter "b" identifies a field as a bottom field.

In this example, field $I_{2t}$ can be a first field because it will be the first field of picture $I_2$ to be displayed in normal playback. Likewise, field $I_{2b}$ can be a last field because it will be the last field of picture $I_2$ to be displayed. Of course, the invention is not limited to this example, as any other suitable field of a reference picture can be a first field or a last field. For instance, in certain cases, picture $I_{2b}$ can be the first field of picture $I_2$ to be displayed and can be a first field, and picture $I_{2t}$ can be the last field to be displayed and can be a last field.

Referring back to FIG. 3, if the dummy B field picture is a backward predicted field picture and the first field of a reference picture is a top field, the motion_vertical_field_select[0][1] flag 334 can be set to a value of "0" to indicate that the dummy B field picture will be predicted from the top field of the reference picture. Alternatively, if the dummy B field picture is a forward predicted dummy B field picture and the last field of the reference picture is a bottom field, the motion_vertical_field_select[0][0] flag can be set to a value of "1" to instruct a decoder that the dummy B field picture will be predicted from the bottom field of the reference picture.

An example of these particular prediction schemes is illustrated in FIG. 4B. As shown and similar to FIG. 4A, picture $I_2$ can be a reference picture having a top field $I_{2t}$ and a bottom field $I_{2b}$. In accordance with the inventive arrangements, a backward predicted dummy B field picture, $B_{dfb}$, can be predicted from the first field of picture $I_2$, in this case field $I_{2t}$. The letter "d" signifies that the B picture is a dummy B picture, the letter "f" represents the picture as a field picture and the letter "b" designates the dummy B field picture as a backward predicted dummy B field picture.

In another arrangement, a forward predicted dummy B field picture, $B_{dff}$, can be predicted from the last field of picture $I_2$, which happens to be field $I_{2b}$ in this example. Like the discussion above, the letter "d" and the letter "f" immediately following the letter "d" respectively represent that the picture is a dummy B field picture. The second letter "f" indicates that the dummy B field picture is a forward predicted field picture. It is understood that the invention is not limited to these examples, as a dummy B field picture, irrespective of whether it is a forward predicted or a backward predicted field picture, can be predicted from any other suitable field of a reference picture. Moreover, the reference picture is not limited to an I picture, as the reference picture can also be a P picture.

Nevertheless, predicting dummy B field pictures in accordance with the above examples can help control the vibrating pictures artifact. This is possible because the dummy B field pictures and the fields of the reference picture can be displayed in a manner that limits the amount of vibration of a moving object. For example, if the dummy B field picture is a backward predicted field picture, limiting the prediction of the dummy B field picture—and any subsequent backward predicted dummy B field pictures—to being predicted from the first field of the reference picture will ensure that a mere single shift in the position of a moving object will occur. This principle holds true no matter how many backward predicted dummy B field pictures are inserted in a video signal.

That is, a moving object will appear in a single location of each of the backward predicted dummy B field pictures and the first field of the reference picture and will shift only one time to a different location when the second field of the reference picture is displayed. This discussion also applies to forward predicted dummy B field pictures that are predicted from the second field of a reference picture. Minimizing the shift of a moving object can also be performed with any combination of forward and backward predicted dummy B field pictures, if the forward predicted pictures are predicted from the second field of the reference picture and the backward predicted pictures are predicted from the first field.

Continuing with step 228 of FIG. 2, another portion of the first indicator can include several motion_code flags and these motion_code flags can be set. For example, in accordance with the inventive arrangements, the dummy B field picture can include at least one motion vector having horizontal and vertical motion components. As shown in FIG. 3, the motion vector can include a motion_code[0][1][0] or [0][1][1] flag 338 and a motion_code[0][0][0] or [0][0][1] flag 340. The motion_code[0][1][0] or [0][1][1] flag 338 is a flag associated with a backward predicted dummy B field picture, and the motion_code[0][0][0] or [0][0][1] flag 340 is directed to a forward predicted dummy B field picture. In one arrangement, the motion vector can be set to a value of "1" thereby indicating that the horizontal and vertical motion components of the motion vector will have a value of "0."

Setting the horizontal and vertical motion components to a value of "0" without encoding the residual signal allows the dummy B field picture to include very few bits, especially when compared to conventional I, P or B pictures, including I, P or B field pictures. Accordingly, these pictures can be transmitted over a transmission line to a remote decoder to reduce the average bit rate of a trick mode video signal. It should be noted, however, that a dummy B field picture predicted from a reference picture is not limited to systems where remote decoding takes place, as these field pictures can be used with any other suitable arrangement. Referring back to FIG. 2, although not illustrated by method 200, each of the steps concerning the setting of flags or parameters associated with the macroblocks of a dummy B field picture, i.e., steps 224, 226 and 228, can be repeated for each non-skipped macroblock of the dummy B field picture. Finally, the method 200 can end at step 230.

Although the present invention has been described in conjunction with the embodiments disclosed herein, it should be understood that the foregoing description is intended to illustrate and not limit the scope of the invention as defined by the claims.

The invention claimed is:

1. A method of generating a dummy bidirectional predictive field picture, comprising the steps of:
    setting at least a portion of a first indicator of the dummy bidirectional predictive field picture to indicate that no encoding of a residual signal will occur; and
    setting at least a portion of a second indicator of the dummy bidirectional predictive field picture to indicate that the dummy bidirectional predictive field picture will be predicted from at least one field among a first field and a last field of a reference picture to control a vibration artifact.

2. The method according to claim 1, wherein said setting the first indicator step further comprises setting at least a portion of the first indicator of the dummy bidirectional predictive field picture to indicate that no discrete cosine transform (DCT) encoding of the residual signal will occur.

3. The method according to claim 1, wherein the dummy bidirectional predictive field picture includes a plurality of macroblocks and wherein at least a portion of the first indicator is contained within a macroblock header.

4. The method according to claim 3, wherein each macroblock contains at least one motion vector having horizontal and vertical motion components and said setting the first indicator step comprises the step of setting at least a portion of the first indicator to indicate that the horizontal and vertical motion components will be zero.

5. The method according to claim 4, wherein the dummy bidirectional predictive field picture is a backward predicted field picture and at least a portion of the first indicator includes a motion_code[0][1][0] flag and a motion_code[0][1][1] flag, wherein said step of setting at least a portion of the first indicator includes setting the motion_code[0][1][0] flag and the motion_code[0][1][1] flag to a value of one.

6. The method according to claim 4, wherein the dummy bidirectional predictive field picture is a forward predicted field picture and at least a portion of the first indicator includes a motion_code[0][0][0] flag and a motion_code[0][0][1] flag, wherein said step of setting at least a portion of the macroblock header includes setting the motion_code[0][0][0] flag and the motion_code[0][0][1] flag to a value of one.

7. The method according to claim 1, wherein the reference picture is at least one of an intra picture and a predictive picture.

8. The method according to claim 1, wherein the reference picture is at least one of a non-progressive picture, a progressive picture and a field picture.

9. The method according to claim 1, wherein the dummy bidirectional predictive field picture is a backward predicted field picture and the at least one field from which the dummy bidirectional predictive field picture is predicted is a first field of the reference picture.

10. The method according to claim 9, wherein the first field is a top field and at least a portion of the second indicator is in a macroblock header, wherein at least a portion of the second indicator includes a motion_vertical_field_select[0][1] flag, and wherein said step of setting at least a portion of the second indicator comprises the step of setting the motion_vertical_field_select[0][1] flag to a value of zero.

11. The method according to claim 9, wherein the first field is a bottom field and at least a portion of the second indicator is in a macroblock header, wherein at least a portion of the second indicator includes a motion_vertical_field_select[0][1] flag, and wherein said step of setting at least a portion of the second indicator comprises the step of setting the motion_vertical_field_select[0][1] flag to a value of one.

12. The method according to claim 1, wherein the dummy bidirectional predictive field picture is a forward predicted field picture and the at least one field from which the dummy bidirectional predictive field picture is predicted is a last field of the reference picture.

13. The method according to claim 12, wherein the last field is a top field and at least a portion of the second indicator is in a macroblock header, wherein at least a portion of the second indicator includes a motion_vertical_field_select[0][0] flag, and wherein said step of setting at least a portion of the second indicator comprises the step of setting the motion_vertical_field_select[0][0] flag to a value of zero.

14. The method according to claim 12, wherein the last field is a bottom field and at least a portion of the second indicator is in a macroblock header, wherein at least a portion of the second indicator includes a motion_vertical_field_select[0][0] flag, and wherein said step of setting at least a portion of the second indicator comprises the step of setting the motion_vertical_field_select[0][0] flag to a value of one.

15. The method according to claim 3, further comprising the step of skipping at least a portion of the macroblocks when the dummy bidirectional predictive field picture and the at least one field of the reference picture have the same parity.

16. A system for generating a dummy bidirectional predictive field picture, comprising:

a controller for reading data from a storage medium; and
a processor, wherein the processor is programmed to:
set at least a portion of a first indicator of the dummy bidirectional predictive field picture to indicate that no encoding of a residual signal will occur; and
set at least a portion of a second indicator of the dummy bidirectional predictive field predictive picture to indicate that the dummy bidirectional predictive field picture will be predicted from at least one field among a first field and a last field of a reference picture to control a vibration artifact.

17. The system according to claim 16, wherein the processor is further programmed to set at least a portion of the first indicator of the dummy bidirectional predictive picture to indicate that no discrete cosine transform (DCT) encoding of the residual signal will occur.

18. The system according to claim 16, wherein the dummy bidirectional predictive field picture includes a plurality of macroblocks and wherein at least a portion of the first indicator is contained within a macroblock header.

19. The system according to claim 18, wherein each macroblock contains at least one motion vector having horizontal and vertical motion components and the processor is further programmed to set at least a portion of the first indicator to indicate that the horizontal and vertical components will be zero.

20. The system according to claim 19, wherein the dummy bidirectional predictive field picture is a backward predicted field picture and at least a portion of the first indicator includes a motion_code[0][1][0] flag and a motion_code[0][1][1] flag, wherein the processor is further programmed to set the motion_code[0][1][0] flag and the motion_code[0][1][1] flag to a value of one.

21. The system according to claim 19, wherein the dummy bidirectional predictive field picture is a forward predicted field picture and at least a portion of the first indicator includes a motion_code[0][0][0] flag and a motion_code[0][0][1] flag, wherein the processor is further programmed to set the motion_code[0][0][0] flag and a motion_code[0][0][1] flag to a value of one.

22. The system according to claim 16, wherein the reference picture is at least one of an intra picture and a predictive picture.

23. The system according to claim 16, wherein the reference picture is at least one of a non-progressive picture, a progressive picture and a field picture.

24. The system according to claim 16, wherein the dummy bidirectional predictive field picture is a backward predicted field picture and the at least one field from which the dummy bidirectional predictive field picture is predicted is a first field of the reference picture.

25. The system according to claim 24, wherein the first field is a top field and at least a portion of the second indicator is in a macroblock header, wherein at least a portion of the second indicator includes a motion_vertical_field_select[0][1] flag, and wherein the processor is further programmed to set the motion_vertical_field_select[0][1] flag to a value of zero.

26. The system according to claim 24, wherein the first field is a bottom field and at least a portion of the second indicator is in a macroblock header, wherein at least a portion of the second indicator includes a motion_vertical_field_select[0][1] flag, and wherein the processor is further programmed to set the motion_vertical_field_select[0][1] flag to a value of one.

27. The system according to claim 16, wherein the dummy bidirectional predictive field picture is a forward predicted field picture and the at least one field from which the dummy bidirectional predictive field picture is predicted is a last field of the reference picture.

28. The system according to claim 27, wherein the last field is a top field and at least a portion of the second indicator is in a macroblock header, wherein at least a portion of the second indicator includes a motion_vertical_field_select[0][0] flag, and wherein the processor is further programmed to set the motion_vertical_field_select[0][0] flag to a value of zero.

29. The system according to claim 27, wherein the last field is a bottom field and at least a portion of the second indicator is in a macroblock header, wherein at least a portion of the second indicator includes a motion_vertical_field_select[0][0] flag, and wherein the processor is further programmed to set the motion_vertical_field_select[0][0] flag to a value of one.

30. The system according to claim 18, wherein the processor is further programmed to skip at least a portion of the macroblocks when the dummy bidirectional predictive field picture and the at least one field picture of the reference picture have the same parity.

* * * * *